United States Patent
Ni

(12) 
(10) Patent No.: US 6,367,371 B1
(45) Date of Patent: Apr. 9, 2002

(54) AUTOMATIC FOOD PROCESSING DEVICE

(76) Inventor: Jian-Ming Ni, 75 Springbrook Drive, Richmond Hill, Ontario (CA), L4B 3R3

( * ) Notice: Subject to any disclaimer, the term of this patent is extended or adjusted under 35 U.S.C. 154(b) by 0 days.

(21) Appl. No.: 09/925,927

(22) Filed: Aug. 10, 2001

(51) Int. Cl.⁷ .............................. A23L 1/00; A23L 3/00; A47J 27/00; A47J 37/00
(52) U.S. Cl. .......................... 99/348; 99/355; 99/443 R; 99/427; 219/389; 219/400; 366/146; 366/220; 366/221
(58) Field of Search .......................... 99/348, 352–355, 99/443 R, 443 C, 426, 427, 444–450, 477–479; 126/21 A; 219/400, 389, 390, 386, 411, 392; 366/144–146, 220, 221, 225–231

(56) References Cited

U.S. PATENT DOCUMENTS

| | | | | |
|---|---|---|---|---|
| 4,103,605 A | * | 8/1978 | Hemborg et al. | 99/348 X |
| 4,120,981 A | * | 10/1978 | Burkhart | 426/231 |
| 4,304,177 A | * | 12/1981 | Loeffler et al. | 99/427 X |
| 4,430,003 A | * | 2/1984 | Beattie et al. | 366/228 X |
| 4,450,758 A | * | 5/1984 | Belinkoff et al. | 99/348 X |
| 4,733,607 A | * | 3/1988 | Star et al. | 366/320 X |
| 5,134,927 A | * | 8/1992 | McCarthy, III et al. | 99/443 R |
| 5,182,981 A | * | 2/1993 | Wilcox | 99/348 X |
| 5,193,444 A | * | 3/1993 | Bar-Sheshet | 219/389 X |
| 5,520,457 A | * | 5/1996 | Gontero et al. | 366/230 X |
| 5,907,994 A | * | 6/1999 | Dotan | 219/389 X |
| 5,910,264 A | * | 6/1999 | Dauliach | 219/400 X |
| 6,234,066 B1 | * | 5/2001 | Zittel et al. | 99/348 |

* cited by examiner

Primary Examiner—Timothy F. Simone
(74) Attorney, Agent, or Firm—David W. Wong

(57) ABSTRACT

A food processing device for automatically cooking and processing food is shown. The device has a cylindrical cooking vessel positioned in a sloping manner and rotatably supported on rotary wheels. Variable heater elements are provided at the cooking vessel to subject the food to selected cooking heat patterns. The food advances through the cooking vessel by gravitational force and the rotational movement of the vessel and it is also being tossed and turned continuously to ensure even cooking and from adhering to the inner side wall of the vessel. A pre-cleaning unit is provided for cleaning the food thoroughly prior to cooking and a cooling unit cools the cooked food to a desired temperature for packaging.

19 Claims, 4 Drawing Sheets

AUTOMATIC FOOD PROCESSING DEVICE

FIELD OF INVENTION

This invention relates to continuous mass processing systems for food and particularly relates to a mass processing machine for producing pre-cooked vegetable and the like. More particularly, it relates to a food processing machine in which the food is advanced through the machine by gravitation and rotational movement of a sloping cooking vessel during cooking.

BACKGROUND OF THE INVENTION

Labor intensive processes are normally employed in producing pre-cooked food for commercial purposes; particularly, when the pre-cooked food is to be packaged in plastic bags for merchandising. In such process, the ingredients must first be cleaned, washed and cut manually prior to being cooked in a cooking pot. After the food is cooked it is then removed from the pot and is dried to a state that it may be packaged in bags for merchandising. The process is time consuming and labor intensive and it is usually unsanitary since the food must be transferred from one stage in the process to another stage manually. The process is even more problematic for vegetable since the vegetable must be throughly cleaned to rid of sand, dirt and other foreign substances usually adhered tenaciously thereto.

Some food processing machines have a cooking oven in which the food passes through the oven by a conveyor means. The food lies stationary on the conveyor means while it is being cooked. Such machines are not suitable for processing food such as vegetable in which the ingredients must be agitated and turned while it is being cooked in order that the food is cooked evenly. Moreover, the food would tend to adhere to the conveyor means rendering the latter very difficult to clean

SUMMARY OF THE INVENTION

It is a principal object of the present invention to provide a machine for mass producing pre-cooked food such as vegetable and the like.

It is another object of the present invention to provide a fully automatic pre-cooked vegetable processing machine.

It is another object of the present invention to provide an automatic pre-cooked vegetable processing machine in which the vegetable advances through the cooking vessel by gravitation.

It is another object of the present invention to provide an automatic pre-cooked vegetable processing machine in which the vegetable is tossed and turned constantly during cooking to assure even cooking and to prevent the vegetable from adhering to the inner side wall of the cooking vessel.

It is still another object of the present invention to provide a pre-cooked vegetable processing machine which performs pre-cleaning and washing of the vegetable automatically.

It is another object of the present invention to provide a pre-cooked vegetable processing machine which cooled and dried the cooked vegetable to the desired condition for packaging.

It is yet another object of the present invention to provide a pre-cooked vegetable processing machine in which the component parts are readily accessible for cleaning.

Briefly, the automatic food processing device of the present invention comprises of a cooking vessel having a heating generally cylindrical inner body and an outer shell surrounding the inner body in a spaced manner to form a compartment between the outer surface of the inner body and the outer shell. The inner body has a cylindrical cavity operative for cooking the food therein. The cooking vessel is adjustable to disposed in a sloping angle sloping downwards from a high front end to a lower rear end. A first annular ring is formed on the outer shell and is located adjacent to the front end therein. A second annular ring is formed on the outer shell and is located adjacent to the rear end therein. An annular toothed ring is formed at the middle of the outer shell. The cooking vessel is rotatably supported by the first annular ring resting on a first rotary wheel and the second annular ring resting on a second rotary wheel. The annular toothed ring is engaged with a rotary drive gear operative for rotating the cooking vessel. The first rotary wheel, second rotary wheel and rotary drive gear are mounted on a support base which is adjustable for varying the sloping angle of the cooking vessel. A front end cap is removably disposed at the front end of the cooking vessel, and a generally funnel-shaped input hopper is mounted on the front end cap and it is operative for receiving food to be cooked into the cooking vessel. A rear end cap is removably disposed at the rear end of the cooking vessel; and an exit chute is mounted to the rear end cap and it is operative for releasing the cooked food from the cooking vessel.

DESCRIPTION OF THE DRAWINGS

Other objects and advantages of the present invention will become apparent from the following detailed description of the preferred embodiments thereof in connection with the accompanying drawings in which.

DETAILED DESCRIPTION OF THE PREFERRED EMBODIMENTS

Figure 1:
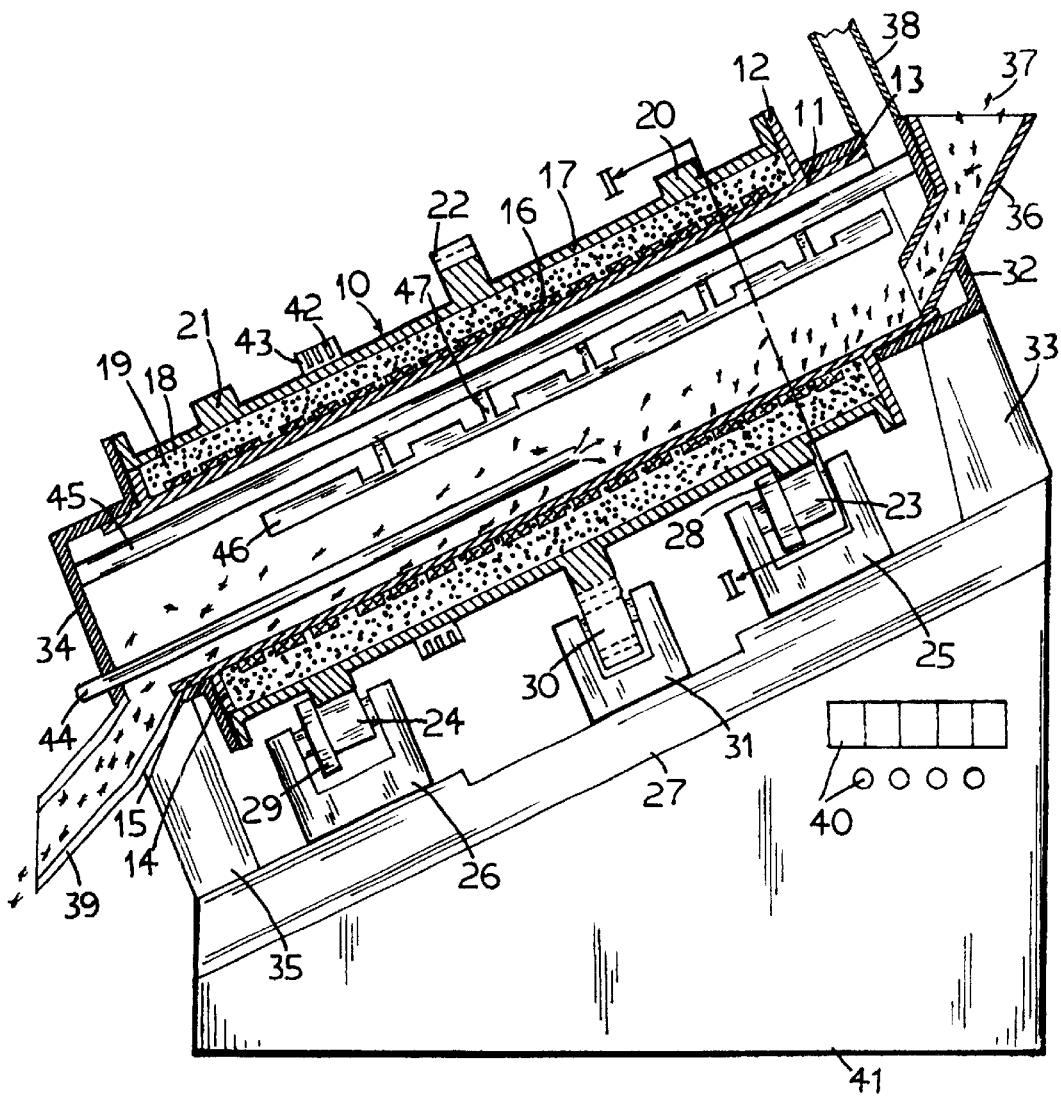
FIG. 1 is a partial sectional side elevation view of the cooking vessel of the machine according to the present invention.
Figure 2:
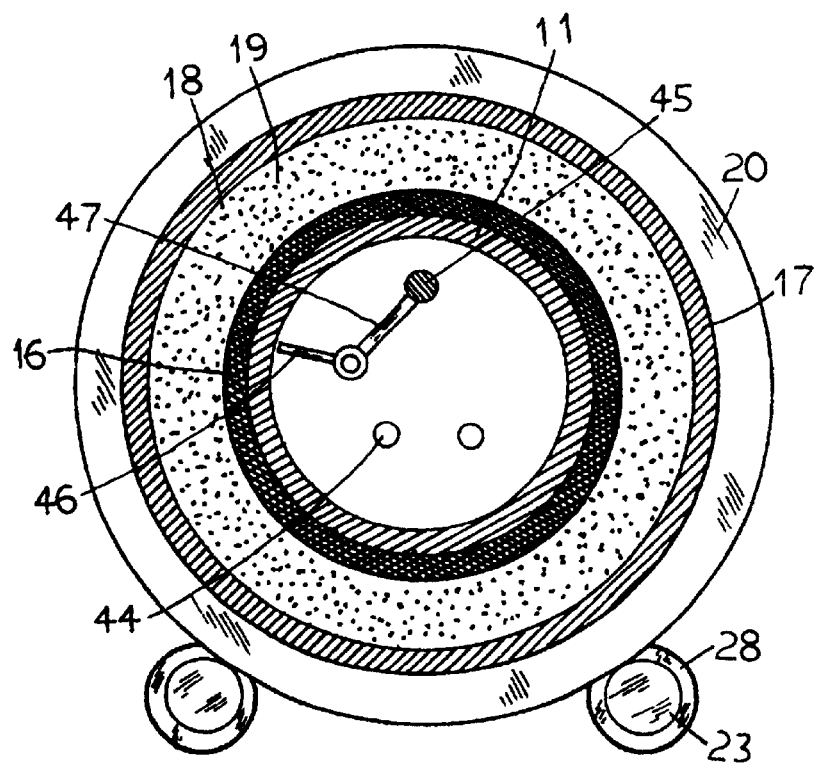
FIG. 2 is a sectional elevation view of the cooking vessel along section line II—II in FIG. 1.

With reference to the drawings wherein like reference numerals designate corresponding parts in the several views, the main cooking vessel 10 is in the form of a hollow elongated cylindrical inner body 11 having an upper flange 12 located at its upper end portion 13 and a lower flange 14 located at its lower end portion 15. The inner body 11 is made of metal such as stainless steel which is suitable for food contact and is easy to maintain clean. A plurality of heater elements 16 are mounted on the outer surface of the inner body 11. The heater elements 16 may be annular in shape and circumscribing the outer surface of the inner body 11. Alternatively, they may be individual plate type heater elements mounted in an even fashion around the outer surface of the inner body 11. The heater elements 16 may be operated to provide selected cooking patterns over the length of the cooking vessel 10. For example, the heater elements 16 located at the front section of the cooking vessel 10 may have a higher heat and those in the middle section may have a medium heat and those in the lower section may have a lower heat; thus the heat of the food would be gradually reduced as it advances through the cooking vessel 10 to facilitate further processing after cooking. The cooking vessel 10 has an outer generally cylindrical outer shell 17 having end flanges mounted to the upper and lower flanges 12 and 13 of the inner body 11. A chamber 18 is formed between the inner body 11 and the outer shell 17 for housing the heater elements 16, and the chamber 18 is filled with heat insulation material 19 to reduce the heat loss through the outer shell 17 as well as to maintain the outer shell 17 at a relatively lower temperature for safe contact. An upper circular ring 20 is formed at the upper portion of the outer shell 17, and a similar lower circular ring 21 is formed at the lower portion of the outer shell 17. A middle toothed circular drive ring 22 is formed at the center of the outer shell 17.

The upper circular ring 20 and the lower circular ring 21 are in contact with and resting on two rotary wheels 23 and 24 rotatably mounted on two U-shaped brackets 25 and 26 respectively such that the cooking vessel 10 is rotatable on the rotary wheels 23 and 24. The U-shaped brackets 25 and 26 are mounted on a sloping support base 27 such that the cooking vessel 10 may be positioned in a sloping manner upwardly with its upper end located higher than the lower end The slope of the sloping base 27 is adjustable for varying the sloping angle of the cooking vessel 10. The rotary wheels 23 and 24 have larger lower rims 28 and 29 respectively abutting the lower edge of the circular rings 20 and 21 for preventing the sloping cooking vessel 10 from sliding downwards to disengage from the rotary wheels 23 and 24.

The toothed circular drive ring 22 engages with a rotary drive gear 30 mounted on a bracket 31 located on the support base 27. The drive gear 30 is operative by a motor for rotating the cooking vessel 10.

The upper end of the cooking vessel 10 is covered by an upper end cap 32 which is mounted to a fixed support 33 located at the upper end of the support base 27. Similarly, the lower end of the cooking vessel 10 is covered by a lower end cap 34 mounted to a second fixed support 35 located at the lower end of the support base 27.

A funnel shaped hopper 36 is provided at the upper end of the upper end cap 32 for loading the vegetable 27 into the cooking vessel 10. A vent tube 38 is located at the upper side of the upper end cap 32 for venting water vapor from the cooking vessel 10. An exit spout 39 is provided at the lower end cap 34 for releasing the cooked vegetable from the cooking vessel 10.

Controls 40 for adjusting the slope of the base support 27, the actuation of the motor for rotating the drive gear 30, and the selection of the heating pattern of the heater elements 16 are located on the frame 41 for the support base 27.

Electrical power for operating the heater elements 16 is supplied to the heater elements through rotary contacts 42 mounted on an insulated circular ring 43 provided on the outer shell 17 of the cooking vessel 10.

At least one steam tube 44 is mounted to the lower cap 34 and extending into the cooking vessel 10; and it is operative for injecting steam into the cooking cavity of the cooking vessel 10 to provide the moisture for cooking the vegetable.

The vegetable in the cooking vessel 10 not only would be advanced therethrough by the rotation and the sloping position of the cooking vessel, it would also be tossed and turned constantly to assure even cooking. The tossing and turning of the vegetable also would prevent it from adhering to the inner side wall of the cooking vessel.

An elongated rod 45 is located within the cooking cavity of the cooking vessel 10 and it extends between the upper and lower end caps 32 and 34 and is positioned close and parallel to the inner side wall of the cooking cavity. An elongated scraping plate 46 is mounted to the rod 45 by a plurality of adjustable arms 47. The arms are adjustable to urge the side edge of the plate 46 to abut against the inner side wall of the cooking vessel 10. Thus, when the cooking vessel 10 rotates during cooking, the scraping plate 46 would inherently removing any vegetable which may become adhered to the inner side wall of the cooking vessel 10.

Additionally or alternatively a plurality of heater elements 16A may be mounted on an elongated tubing 48 located in the cooking cavity and extending between the upper and lower end caps 32 and 34 such that these heater elements may be operated to provide the heat or additional heat for cooking the vegetable. Furthermore, a plurality of brushes 49 may be mounted on an additional elongated rod 50 extending between the upper and lower end caps; and the brushes 49 are in contact with the inner side wall of the cooking cavity for removing therefrom any vegetable which may become adhering to its inner side wall.

Figure 4:
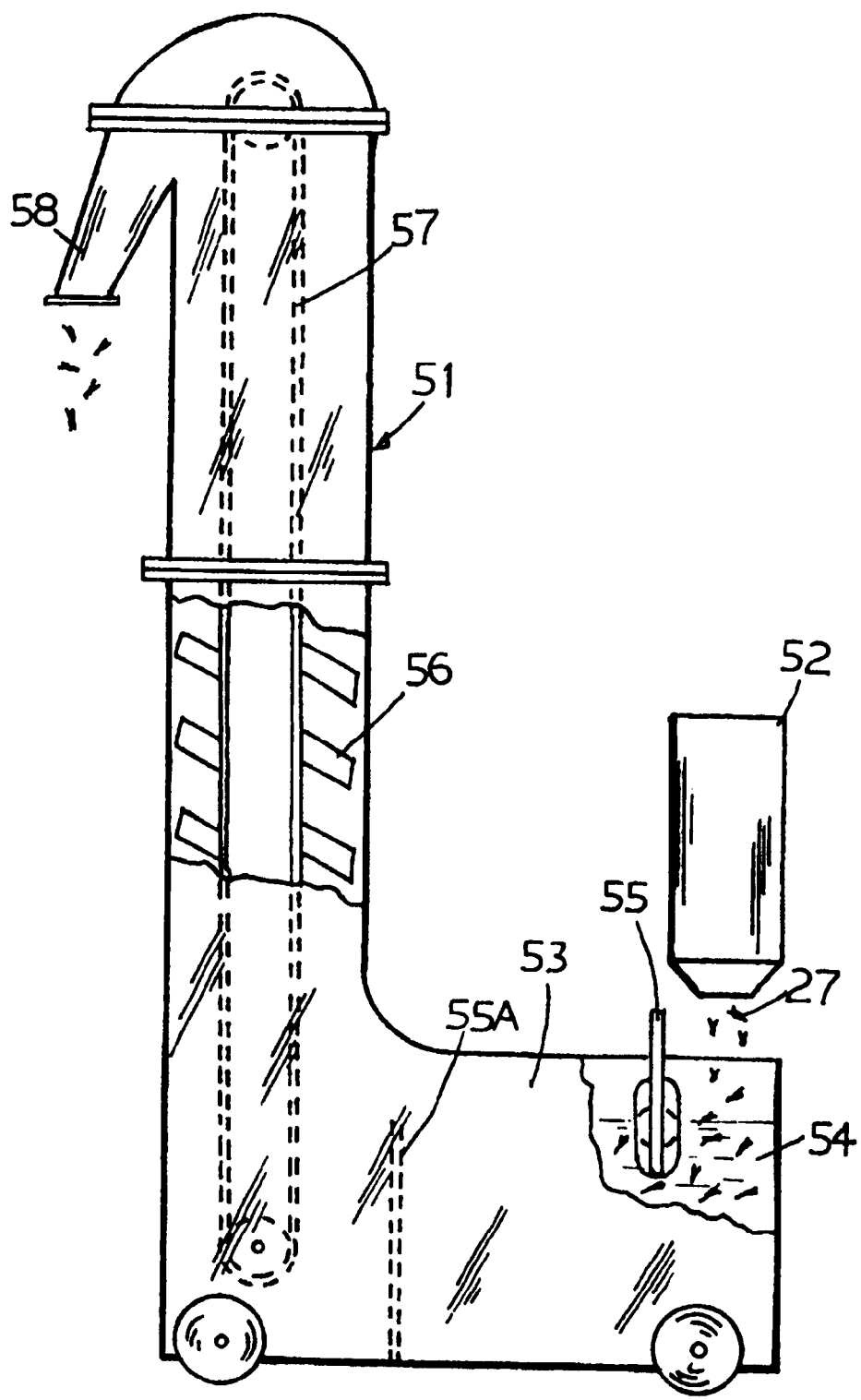
FIG. 4 is a front elevation view of the cutting, cleaning and washing device of the present machine with parts of the enclosure partially removed to show the internal components therein.
Figure 5:
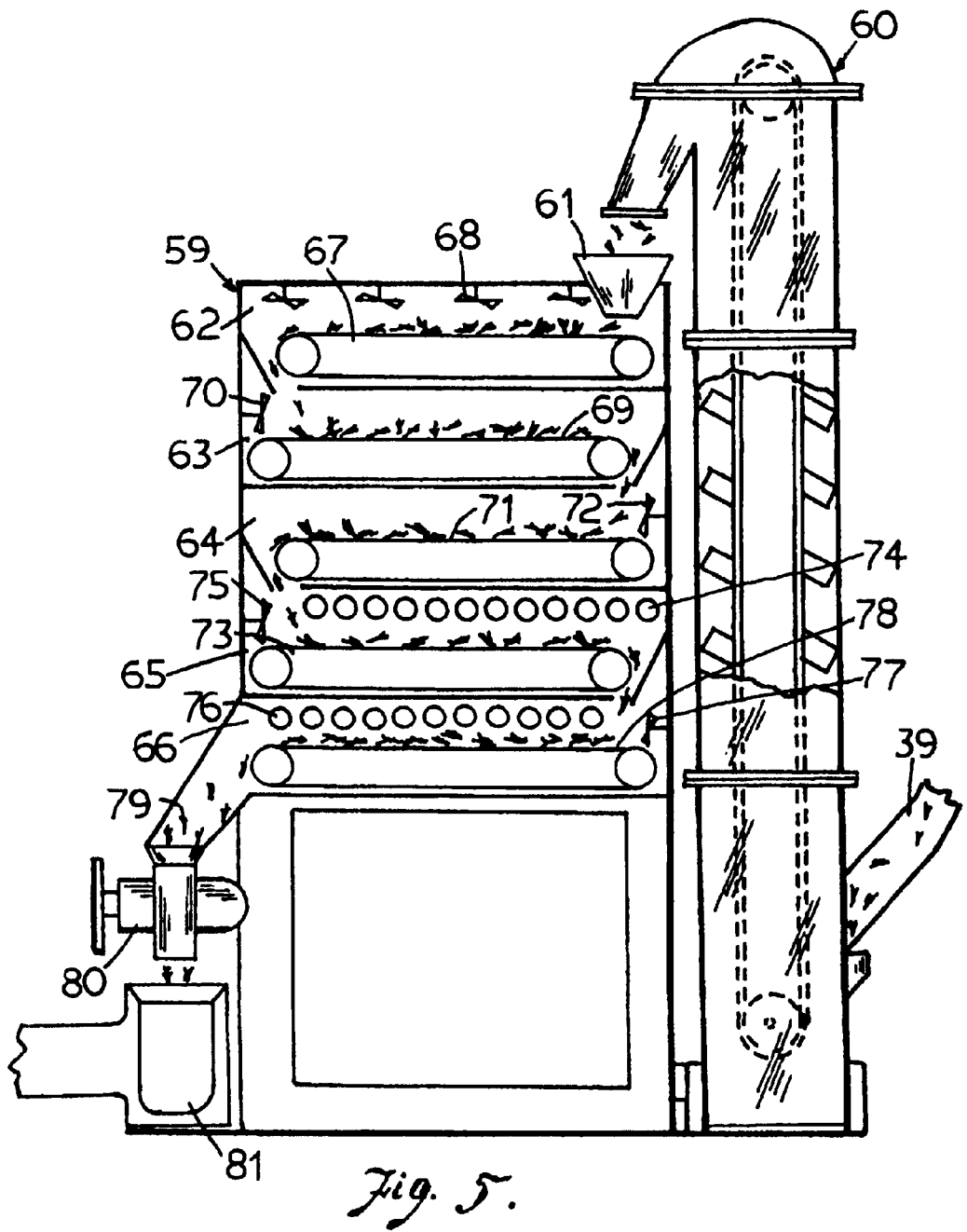
FIG. 5 is a front elevation view of the drying and cooling device in the machine of the present invention.

A pre-cleaning device 51 operative for cutting and cleaning the vegetable for use with the cooking vessel 10 is shown in FIG. 4. The pre-cleaning device 51 has a cutting unit 52 for cutting the vegetable into the desired size. It has a water well 53 for holding the water 54 for washing the cut vegetable. The vegetable 27 in the water well 53 are agitated by a rotatable and extensible arm 55 for removing the sand, dirt and other foreign substances from the vegetable. The cleansed vegetable is passed over the top of a division wall 55A to the bins 56 of a delivering elevator 57. The vegetable is released from the pre-cleaning device 51 through the outlet chute 58 therein into the cooking vessel 10 through the hopper 36 as shown in FIG. 1. The cooked vegetable from the cooking vessel 10 is passed to a cooling unit 59 as shown in FIG. 5 through a second elevator 60 which is similar in structure to the elevator 57. The vegetable is delivered to the input hopper 61 of the cooling unit 59. The cooling unit 59 has a plurality of upper air cool chambers and lower final ain conditioning cooling chambers. Three air cool chambers 62, 63 and 64 and two final air conditioning cooling chambers 65 and 66 are shown for simplicity of illustration.

The vegetable 27 falls from the input hopper 61 onto a first conveyor belt 67 located in the first chamber 62 which has a plurality of cooling fans 68 provided on its ceiling for cooling the cooked vegetable quickly and to remove a large amount of moisture therefrom. The vegetable falls from the first chamber 62 onto a second conveyor belt 69 in the second chamber 63 which may have a single cooling fan 70 for blowing the cooling air over the entire length of the chamber. The vegetable from the second chamber 63 falls onto a third conveyor belt 71 in the third chamber 64 similar in construction to the second chamber 63 and having a cooling fan 72 for further air cooling the vegetable. The air cooled cooked vegetable falls from the third chamber 64 onto a fourth conveyor belt 73 in the fourth chamber 65 which has a plurality of air conditioning condenser tubes 74 for cooling the cooked vegetable further and to remove the moisture therefrom with a blower fan 75. The vegetable is then passed from the fourth chamber 65 into a final cooling chamber 66 for cooling by a plurality of air conditioning condenser tubes 76 and a blower fan 77. The completely cooled cooked vegetable then falls from the final conveyor belt 78 into the exit chute 79. A control valve 80 located at the exit chute 79 is operative for dispensing a predetermined amount of the cooked vegetable into the bag 81 for packaging it for merchandising.

The vegetable advances through the sloping cooking vessel 10 by gravitation urged by the rotation movement of the cooking vessel 10 during the cooking operation. The vegetable is also being turned and tumbled in the cooking vessel 10 to ensure that it is evenly and thoroughly cooked. The sloping angle of the cooking vessel 10 may be adjusted to select the desired rate or speed at which the vegetable passes through the cooking vessel 10 to select a desired cooking time. The vegetable is cooked with a selected heating pattern by varying the heating of the various heater elements 16 and/or 16A.

The vegetable would slide through the cooking vessel by gravitation due to the sloping position and the rotational movement of the cooking vessel. The rotational movement of the cooking vessel also tosses and turns the vegetable while it is being cooked to ensure even cooking and to reduce the tendency of the vegetable to adhere to the inner side wall of the inner body 11 of the cooking vessel 10. Also, the speed of travel and length of cooking time may be varied and selected by varying the sloping angle and the rotational speed of the cooking vessel.

Figure 3:
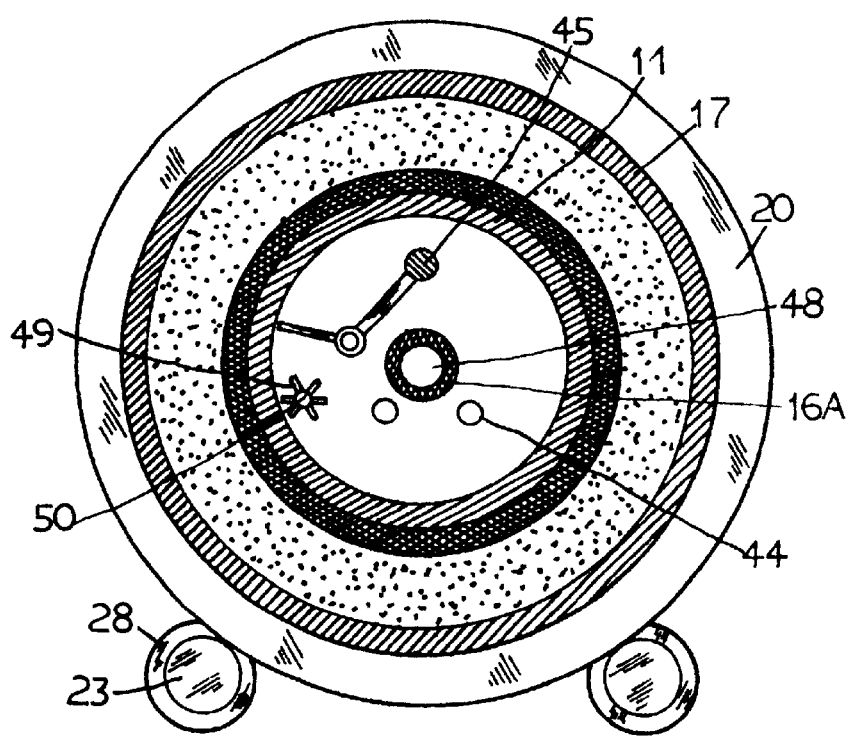
FIG. 3 is a sectional elevation view of the cooking vessel along section line II—II of a cooking vessel having alternative embodiments.

Any vegetable which may yet adhere to the inner side wall of the cooking vessel 10 will be released therefrom by the scraping plate 46 as the cooking vessel 10 turns during the cooking operation. The closeness of the scraping plate 46 to the inner side wall of the cooking vessel 10 may be varied by adjusting the arms 47 so as to ensure that no vegetable would become adhering to the inner side wall of the cooking vessel 10. As shown in FIG. 3, alternatively or additionally a plurality of brushes 49 may be provided in the cooking vessel 10 to maintain that no vegetable would adhere to the inner side wall of the cooking vessel 10 in the cooking operation.

Steam is injected into the cooking vessel 10 through steam tubes 44 for providing the moisture for cooking the vegetable.

Since the inner side wall of the cooking vessel is constantly kept clean, it requires little or no additional cleaning; and if required, the end caps may be easily removed for performing such task.

While the preferred embodiments of the invention have been described above. It will be recognized and understood that various modifications may be made therein and the appended claims are intended to cover all such modifications which may fall within the spirit and scope of the invention.

What I claim is:

1. An automatic food processing device comprising,
   a cooking vessel having a heating generally cylindrical inner body and an outer shell surrounding said inner body in a spaced manner to form a compartment between an outer surface of said inner body and said outer shell, said inner body having a cylindrical cavity operative for cooking said food, said cooking vessel being adjustable to disposed in a sloping angle sloping downwards from a high front end to a lower rear end,
   a first annular ring formed on said out shell and located adjacent to said front end,
   a second annular ring formed on said outer shell and located adjacent to said rear end,
   an annular toothed wheel formed at the middle of said outer shell,
   said cooking vessel being rotatably supported by said first annular ring resting on a first pair of rotary wheels and said second annular ring resting on a second pair of rotary wheels,
   said annular toothed wheel engaged with a rotary drive gear operative for rotating said cooking vessel,
   said first pair of rotary wheels, second pair of rotary wheels and rotary drive gear being rotatably mounted on a support base adjustable for varying said sloping angle of said cooking vessel,
   a front end cap removably disposed at said front end of said cooking vessel, and an input hopper mounted on said front cap and operative for receiving food to be loaded into said cooking vessel,
   a rear end cap removably disposed at said rear end of said cooking vessel, and an exit chute mounted to said rear end cap and operative for releasing said food from said cooking vessel after cooking.

2. An automatic food processing device according to claim 1 wherein said first pair of rotary wheels have a larger lower flange operative for maintaining said first annular ring from engaging with first pair of rotary wheels, and said second pair of rotary wheels also have a larger lower flange operative for maintaining said second annular ring from engaging with said second pair of rotary wheels.

3. An automatic food processing device according to claim 2 including a plurality of heater elements mounted on said inner body's outer surface and disposed within said compartment, said heater elements being operative for heating said cooking vessel.

4. An automatic food processing device according to claim 3 wherein said heater elements are evenly disposed over the outer surface of said inner body, and said heater elements being actuated selectively providing a predetermined heating pattern for cooking said food passing through said cooking vessel.

5. An automatic food processing device according to claim 4 wherein said heater elements are annular heater elements circumscribing said inner body.

6. An automatic food processing device according to claim 5 including a heat insulation material disposed in said compartment between said inner body and said outer shell.

7. An automatic food processing device according to claim 6 including at least one elongated steam tubing extending into said cooking vessel and being operative for injecting steam into said cooking vessel.

8. An automatic food processing device according to claim 7 including a scraping member located in said cooking vessel and being operative for removing any food from adhering on the inner side wall of said inner body.

9. An automatic food processing device according to claim 8 wherein said scraping member includes an elongated rod mounted to said front end cap and said rear end cap and extending over the entire longitudinal length within said cooking vessel, a plurality of scraping plates mounted to said elongated rod and having a side edge therein abutting against said inner side wall of said inner body.

10. An automatic food processing device according to claim 9 wherein said scraping plates are mounted to said elongated rod by a plurality of adjustable arms operative to vary the degree of abutment of said scraping plates to said inner side wall of said inner body.

11. An automatic food processing device according to claim 10 including a terminal member disposed on said outer shell of said cooking vessel and being operative for connecting electrical power to said heater elements.

12. An automatic food processing device according to claim 11 wherein said terminal member includes an annular electrically insulating ring circumscribing said outer shell, and a plurality of electrically conductive rings disposed in said insulating ring, said conductive rings being connected to said heater elements.

13. An automatic food processing device according to claim 12 including an air venting tube mounted to said front end cap and being operative for venting air and humidity out of said cooking vessel.

14. An automatic cooked vegetable processing system according to claim 13 including a pre-cleaning device disposed adjacent to said cooking vessel, said pre-cleaning device having a washing well for washing said vegetable and a conveyor elevator for delivering cleaned and washed vegetable to said input hopper of said cooking vessel.

15. An automatic cooked vegetable processing system according to claim 14 including a vegetable cutting unit located above said washing well and being operative for cutting said vegetable to a selected size.

16. An automatic cooked vegetable processing system according to claim 15 including a rotatable and extensible agitating arm in said washing well and operative for agitating said vegetable and water in said well to ensure removal of sand, dirt and other foreign substances from said vegetable.

17. An automatic cooked vegetable processing system according to claim 16 including a cooling device located adjacent to said cooking vessel and operative for removing moisture and cooling said vegetable released from said cooking vessel to a desired temperature, said cooling device including a plurality of air cool chambers and air conditioning chambers for cooling said vegetable to a condition suitable for packaging.

18. An automatic cooked vegetable processing system according to claim 17 wherein said air cool chambers include a top chamber having a first horizontal conveyor belt operative for receiving cooked vegetable from said cooking vessel, a plurality of cooling fans mounted on a ceiling of said top chamber and operative for removing moisture content and cooling said cooked vegetable disposing on said first conveyor belt, a second chamber having a second horizontal conveyor belt therein operative to receive said vegetable after passing through said top chamber, a first horizontally mounted cooling fan disposed in said second chamber and operative to cool said vegetable disposed on said second conveyor belt, a third chamber having a third horizontal conveyor belt operative for receiving said vegetable after passing through said second chamber, a second horizontally mounted cooling fan disposed in said third chamber operative for cooling said vegetable further, and said air conditioning chamber include a fourth chamber having a fourth conveyor belt therein operative for receiving said vegetable after passing through said third chamber, said fourth chamber having a first plurality of air conditioning cooling tubes therein operative for cooling said vegetable disposed on said fourth conveyor belt further, and a third horizontally mounted fan disposed in said fourth chamber and operative to reduce moisture content of said vegetable further, and a fifth chamber having a fifth conveyor belt therein operative for receiving said vegetable after passing through said fourth chamber, said fifth chamber having a plurality of air conditioning cooling tubes and a fourth horizontally mounted cooling fan operative for cooling and removing further moisture content of said vegetable to a desired condition suitable for packaging.

19. An automatic cooked vegetable processing device according to claim 18 including a controlled dispensing valve coupled to said fifth chamber and operative for dispensing a predetermined amount of said vegetable to a packaging device for packaging said vegetable for merchandising.

* * * * *